May 25, 1926.
C. L. DENISON
ANTISKIDDING DEVICE
Filed April 11, 1924
1,586,074
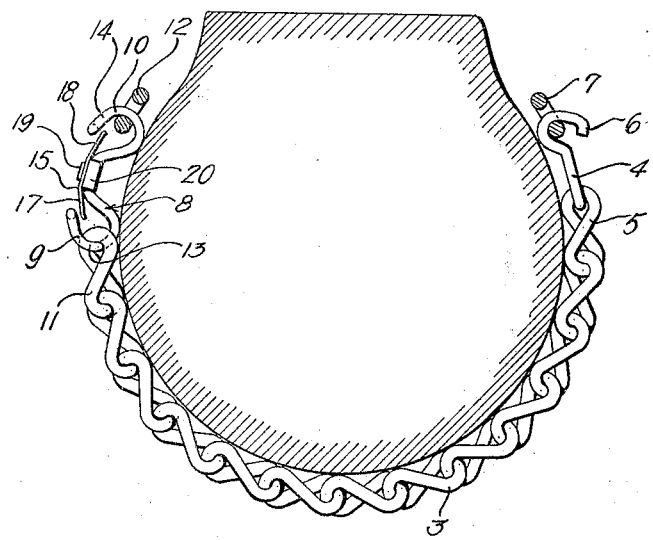
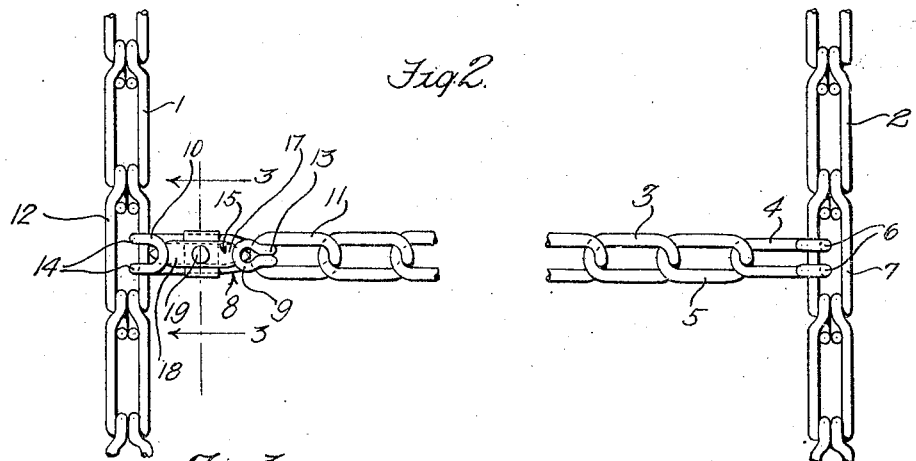
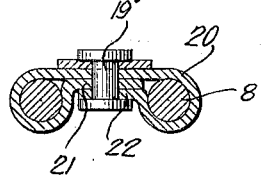
INVENTOR
Charles L Denison
BY
ATTORNEY Patented May 25, 1926.

1,586,074

UNITED STATES PATENT OFFICE.

CHARLES L. DENISON, OF ONEIDA, NEW YORK.

ANTISKIDDING DEVICE.

Application filed April 11, 1924. Serial No. 705,758.

This invention relates to anti-skidding devices adapted for use upon the tires of motor driven vehicles, such as automobiles, motor trucks, and the like.

One of the objects of the invention is to provide a new and improved cross chain adapted to be detachably connected with the side members of non-skid tire chains of the well known "Weed" type.

Another object of the invention is to provide a cross-chain which may be detachably connected with the side members of tire chains without employment of tools of any kind.

A further object of the invention is to provide a cross chain which may be readily applied to a tire chain when the latter is in position upon the wheel of the vehicle.

A still further object of the invention is to provide a new and improved link adapted to be employed in connection with a cross chain construction, such that while both ends of the cross chain are readily attachable and detachable from the side members of a tire chain, there is no danger of either end of the cross chain becoming detached during service.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawing, wherein I have illustrated a preferred form of embodiment of my invention:

Figure 1 is a cross-sectional view taken through a tire chain in position upon the wheel of a vehicle, showing my improved cross chain in side elevation.

Figure 2 is a top plan view of a portion of a tire chain, showing my improved cross chain attached thereto.

Figure 3 is a cross-sectional view, upon an enlarged scale, taken upon lines 3—3 of Fig. 2.

Referring now to the drawing, wherein similar reference characters refer to similar parts throughout the views thereof, the reference numerals 1 and 2 thereof, respectively, denote the side members of an anti-skid tire chain, which may be of the well known "Weed" type. These side members are positioned adjacent either side of the tire, and are of less diameter than the tire itself. These side members are usually connected at spaced intervals with cross chains, which are usually permanently fastened to the links of the side members.

When a cross chain breaks, as often happens in service, the replacing thereof involves the expenditure of considerable labor in effecting the disengagement of the ends of the cross members from the side members of the tire chain, and the replacing of a fresh cross chain. In my construction, however, this is eliminated. In attaining this end, I provide a cross chain 3, with a hook member 4, attached to one of the end links 5 of the cross chain. The prongs 6 of the hook member 4 are detachably connected with one of the links 7 of the side member 2, for instance, as illustrated in Figs. 1 and 2 of the drawings.

The reference numeral 8 denotes the attaching member for the opposite end of the cross chain. This attaching member comprises a length of wire, doubled upon itself to provide the prongs or hooks 9 and 10, which prongs extend outwardly, laterally, and then inwardly, so that the prong 9 may be received in the link 11 of the cross chain, and the prong 10 may be received in the link 12 of the side chain member 1. The side members of the attaching member 8, which form the prong 9, are preferably located in engagement at the point where they engage the link 11 of the cross chain, as indicated at 13, and the side members of the attaching member which form the prong 10, are preferably spaced apart, as indicated at 14, where they engage with the side link 12.

Fixedly mounted upon the attaching member 8 is a keeper 15. This keeper 15, which is preferably formed of spring metal, has oppositely extending prongs 17 and 18. Prong 17 extends into the hook formed by the prong 9 of the attaching member 8, and prong 17 extends into the hook formed by the prong 10 of the attaching member. The ends of the prongs 17 and 18 are preferably slightly spaced from the ends of the prongs 9 and 10 respectively, as clearly indicated in Figure 1 of the drawing.

The keeper 15 is anchored by a rivet 19 to a strap 20, which extends about the side legs of the attaching member 8, the rivet 19 extending through the keeper, and the lapped ends 21 and 22 of the strap. Thus it will be seen that the keeper 15 is firmly anchored upon the attaching member 8.

In attaching the cross chain to the side members of the tire chain, it is merely necessary to hook the prong 9 on one of the links of the side member 2, as clearly indicated in Figs. 1 and 2, and then engage the prong 10 of the attaching member 8 with the opposite link of the side member of the tire chain.

At this point it may be noted that the length of the cross chain is such that the prong 6 of the hook 4 cannot become detached from the link 7 of the side chain 2, until either the prong 9 of the attaching member 8 shall have been disengaged from the link 11 of the cross chain, or the prong 10 of said attaching member shall have become disengaged from the link 12 of the side chain 1.

When the parts are in the position shown in the drawing, the prongs 17 and 18 of the attaching member 8 prevents accidental disengagement of the cross chains during service. It will accordingly be seen that when a cross chain breaks, a new one may be readily positioned upon the tire chain by merely applying the hook member 4 to the side chain 2, and then applying the attaching member 8 either to the end of the tire chain, or to the side link of the side member of the tire chain, whereupon the parts are connected for service.

As many changes could be made in this construction without departing from the scope of the following claims, it is intended that all matter contained in the above description or shown in the accompanying drawings shall be interpreted as illustrative only and not in a limiting sense.

Having thus described my invention what I claim as new and desire to secure by Letters Patent is:

In an anti-skidding device, a detachable link connection comprising a link having ends bent into hook form and the sides of the link between the said hook ends being spaced apart, a spring steel keeper arranged with its ends adjacent to the said hook ends of the link, a strap passing over both sides of the link and closely around the said sides, the ends of the strap being brought together one upon the other beneath the middle of the strap, the said keeper being arranged upon the upper surface of the middle of the strap, and a rivet passing through the keeper and through the middle of the strap and through both ends of the strap to secure all the parts together.

In testimony whereof, I affix my signature.

CHARLES L. DENISON.